(12) United States Patent
Greenthal et al.

(10) Patent No.: US 8,740,098 B2
(45) Date of Patent: Jun. 3, 2014

(54) WATER CONSERVING DEVICES AND PROCESSES

(75) Inventors: Steven M. Greenthal, Buena Park, CA (US); Neal W. Smith, Blue Springs, MO (US)

(73) Assignee: Nitroworks Corporation, Buena Park, CA (US)

(*) Notice: Subject to any disclaimer, the term of this patent is extended or adjusted under 35 U.S.C. 154(b) by 1434 days.

(21) Appl. No.: 12/309,008

(22) PCT Filed: Oct. 14, 2008

(86) PCT No.: PCT/US2008/011713
§ 371 (c)(1),
(2), (4) Date: Jan. 2, 2009

(87) PCT Pub. No.: WO2009/051695
PCT Pub. Date: Apr. 23, 2009

(65) Prior Publication Data
US 2010/0269908 A1    Oct. 28, 2010

Related U.S. Application Data

(63) Continuation-in-part of application No. 11/974,812, filed on Oct. 16, 2007, now Pat. No. 8,245,946.

(51) Int. Cl.
*G05D 23/12* (2006.01)
*G05D 23/185* (2006.01)
*F16K 49/00* (2006.01)
*F16L 53/00* (2006.01)

(52) U.S. Cl.
USPC .................. 236/12.13; 236/12.1; 236/12.11; 137/98; 137/100; 137/337

(58) Field of Classification Search
USPC ............ 236/12.1, 12.11, 12.13; 137/98, 100, 137/337; 4/676
See application file for complete search history.

(56) References Cited

U.S. PATENT DOCUMENTS

| | | | |
|---|---|---|---|
| 1,799,266 A * | 4/1931 | Wallace | 137/111 |
| 2,688,338 A | 9/1954 | Newell | |
| 4,160,461 A | 7/1979 | Vataru et al. | |
| 4,241,749 A * | 12/1980 | Petursson | 137/100 |
| 4,249,695 A | 2/1981 | Dreibelbis | |
| 4,697,614 A | 10/1987 | Powers et al. | |
| 5,339,859 A | 8/1994 | Bowman | |
| 5,452,740 A | 9/1995 | Bowman | |
| 5,603,344 A | 2/1997 | Hall, Jr. | |
| 5,775,372 A | 7/1998 | Houlihan | |
| 6,032,687 A | 3/2000 | Linn | |
| 6,318,400 B1 | 11/2001 | Hope et al. | |
| 6,425,148 B1 | 7/2002 | Chen | |

(Continued)

*Primary Examiner* — Mohammad M Ali
*Assistant Examiner* — Daniel C Comings
(74) *Attorney, Agent, or Firm* — Erickson, Kernell, Derusseau & Kleypas, LLC

(57) ABSTRACT

The initially cold water streams of a household hot water plumbing circuit are accumulated in a storage container to be thereafter drained off with the cold water stream, at various flow restricted levels, thereby conserving water use. This accumulate may be adjustably admixed into the waste products of a household drinking water purification system, thereby diluting it to acceptable levels that may be useful for washing and the like. Additionally, and/or alternatively, the fresh water stream may be admixed into the water purification waste water stream. Each of these water conserving functions is conformed to be combined in a stepwise manner, thereby accommodating budgetary and use growth constraints.

4 Claims, 7 Drawing Sheets

(56) References Cited

U.S. PATENT DOCUMENTS

| | | |
|---|---|---|
| 6,651,574 B1 | 11/2003 | Ellens et al. |
| 6,655,405 B2 | 12/2003 | Hollister et al. |
| 6,997,200 B2 | 2/2006 | King |
| 7,073,528 B2 | 7/2006 | Kempf et al. |
| 7,100,636 B2 | 9/2006 | King |
| 7,243,671 B2 | 7/2007 | Thrash, Jr. et al. |
| 7,392,955 B1 | 7/2008 | Laing |
| 2004/0040601 A1 | 3/2004 | Koelzer |
| 2005/0205680 A1* | 9/2005 | Valente ..................... 236/12.11 |

* cited by examiner

WATER CONSERVING DEVICES AND PROCESSES

REFERENCE TO RELATED APPLICATIONS

This application is a continuation-in-part of U.S. patent application Ser. No. 11/974,812 filed on Oct. 16, 2007 now U.S. Pat. No. 8,245,946 and the benefit if this earlier filing date is claimed for all matter common therewith.

BACKGROUND OF THE INVENTION

1. Field of the Invention

The present invention relates to an apparatus and method for collecting, mixing and reintroduction with the stored cold portions of various household hot water streams the residues of various drinking water purification processes like reverse osmosis in order to accumulate the mix for subsequent less restrictive cold water use.

2. Description of the Prior Art

With increasing population density prudence in the use of the world's resources has become a dominant concern. One resource that is central to all the functions of life is clean water, a resource that is growing scarce and is therefore now the primary concern of most municipalities. Simply, the availability of fresh water now limits most municipal growth and virtually all current housing expansions are associated with costly water recycling and other conservation measures, a cost exchange that will only continue to rise in a world that increases in its mean temperature.

For a long time it has been recognized that the primary component of unnecessary water waste is the early, cool part of a hot water stream that is currently just dumped down the drain until the desired stream temperature is reached. In multiple dwelling structures these losses can become quite large and basic economics have therefore compelled some conservation, like the use of continuously circulating hot water loops which shorten substantially the length, and therefore the volume, of the several branch circuits feeding each hot water valve. While these continuously circulating arrangements have resulted in substantial savings in the daily water use, it is at the cost of electricity to circulate the flow. Moreover, the sheer number of the various circuits branching from the loop results in significant waste of water nonetheless.

The next significant component of fresh water waste is the waste associated with various purification techniques to obtain drinking water, and particularly those effected by reverse osmosis, in which some of the matter that is entrained in the municipal water flow is separated from the stream dedicated for drinking. Most of these processes seek to remove unwanted mineral and pathogenic matter from the drinking water stream and therefore require substantial dilution ahead of the filtering or reverse osmosis membrane to enable the continuing functioning of the process itself. In the course of such dilution large quantities of water, with only somewhat higher concentrations, are again simply washed down the drain.

Accordingly, both the temperature rise time of the household washing streams and also the dilution of the source water needed for purification result in large quantities of wasted water in a household which, once contained and stored, can be dedicated for use in washing or other sanitary functions like flushing the toilet. Significantly, since both these waste streams rarely coincide in time the waste stream associated with raising the water temperature at the shower head becomes useful to dilute even further the source water concentrations in front of the various osmosis or filtering membrane once both are collected in the several storage accumulating containers. Thus both conservation mechanisms may be synergistically combined to optimize both functions.

In the past various mechanisms have been proposed that in one way or another divert the unwanted portions of a water stream into an accumulator or other storage cavity to be saved and thereafter drained with the cold water flow as cold water is demanded. While suitable for the purposes intended these prior mechanisms fail to fully resolve the volumetric requirements of storage and also the functioning of the conserving process itself against the high back pressures of various flow restrictors that therefore the necessary household space burden devoted thereto.

Those skilled in the art, of course, will appreciate that an exactly paired hot water—cold water demand sequence is rare in a household. Similarly, it is wholly unlikely that the waste stream associated with raising the washing flow temperature will match exactly the dilution cycles associated with drinking water purification, but the former will, in fact, prevail. This prevalence, together with the statistical nature of both, suggests a somewhat larger accumulation volume since any practical implementation will need a volumetric storage capacity surplus that will accommodate several unmatched sequences in a row in order to be useful since a full storage reservoir cannot provide the needed diversion volume for either function. In a busy household where the sequential morning hot water demands often exceed the water heater capacity, and little or no cold water is added to cool the stream, a practically sized accumulator needs to accommodate several hot water transients each of a volume equal to the volume of the utilized plumbing branch. Of course, the potential drinking water demands that are interspaced between these cycles only add to the needed storage volume.

Moreover, the calculus of reservoir volume must also consider the efficacy of the reservoir draining process itself, a process effected when cold water is needed either in filtering the drinking stream or in the cold water side of a faucet, and to obtain full benefit thereof this draining rate needs to be maximized to the full cold water flow demanded. But then, the same water use conservation concerns have also fostered various flow restriction mechanisms throughout the household, thus limiting the usefulness of any drainage mechanism in which the draining flow is entrained with, and/or carried along by, the primary cold water flow. More importantly, these flow restrictions reduce the available pressure differentials for any accumulator response and for dispensing of the water thus collected, thereby imposing the need for the pressure compensation thereof which is neither suggested nor taught at all in the art.

The foregoing volumetric concerns are not the whole of it. Like in any statistical process the probabilities of long sequences of uninterrupted repeating water demands of one kind are sufficiently significant that even a very large reservoir sizing will be quickly exceeded. To accommodate these real possibilities the water conserving system will either need to include very large and therefore costly reservoirs or must automatically revert to a by-passing state in order to retain the original basic water supply functions.

While some of these concerns may have had individual attention in the prior art, the complete systematic combination of all these notions has not been fully considered. For example U.S. Pat. No. 4,697,614 to Powers et al., while teaching a diversion into the accumulator of the initial hot water stream, does so by a manually effected selector. The collected water in the accumulator is thereafter drained by entrainment with a reduced pressure cold water flow. While suitable for the purposes intended this particular arrangement demands manual attention to effect its use while also protracting the accumulator drainage by the reduced flow therefrom.

By further example U.S. Pat. Nos. 5,339,859 and 5,452,740, both issued to Bowman, while each replacing the manual selector with a temperature sensing flow control in the hot water circuit, similarly fail to optimize the draining part of the process, with the '740 patent resolving the drainage paradox by directing the accumulated water to irrigate plants. While once more each of these references, and the many others, achieve their respectively intended purposes, the central concern of a convenient, fully automated conservation arrangement that accommodates the varied household functions at grossly limited pressure differentials has not been fully addressed.

It will be appreciated that any demand increases on the municipal water supply, particularly at the currently exacerbated population density levels, will often result in some degradation in the quality of the water itself. Simply, while safe pathogen levels must always be attained, in a stressed setting little reserve is available to attend to matters of taste and household purification systems of drinking water are therefore on the rise. The full conservation aspects of a typical household require attention to the complex interplay of all these several concerns. An automated system that synergistically combines these several functions into a complementing fully automated arrangement conformed to operate in a virtually imperceptible manner is therefore extensively desired and it is one such system that is disclosed herein.

SUMMARY OF THE INVENTION

Accordingly, it is the general purpose and object of the present invention to provide an automated flow control system which diverts all the wasted stream portion of a household water flow into a common accumulator and also drains the accumulator with each opening of the cold water circuit.

Other objects of the invention are to provide an automated flow control system that collects both the drinking water purification by-product stream in a household with the stream of the initially cold portions of a hot water circuit into a closed storage reservoir and thereafter drains the diverted water from the reservoir into the cold water flow by way of a flow preference valve.

Yet further objects of the invention are to provide a fully automated household water flow control system that diverts for storage the initially cold portion of the hot water stream and also the purification by-product stream associated with drinking water and that otherwise retains the customary controls when the storage capacity is reached.

Briefly, these and other objects are accomplished within the present invention by providing a temperature activated diverter valve in the hot water circuit that directs the initially cold portion of the hot water flow into an inlet mechanism on an accumulator once hot water is selected at the faucet assembly with the water thus stored to be thereafter mixed with the cold water flow. This same cold water flow may also include as an admixture the stored byproduct from the household drinking water purification process with its somewhat elevated concentration of entrained matter contained in a further accumulator and when either of these accumulators is full their inlet assemblies redirect their respective flows either straight into the open hot water outlet or right down the drain. Thus the basic functions of both are retained even though the conservation aspects may be temporarily lost.

To implement these functions both the accumulator inlet assemblies include branching connections controlled by check valves and respectively an accumulator ratio shuttle on the hot water circuit and an adjustable mixing ratio assembly controlling the dilution of the concentrated byproduct of purification. The interconnections therebetween may then be variously combined to accommodate the various plumbing arrangements of a typical household and to obtain the above benefits of dilution.

More precisely, the ratio shuttle resolves the pressures thereacross by the area ratio of its respective opposed faces, with the larger shuttle area exposed to the accumulator interior while the smaller face area sees the cold water circuit and when the accumulator begins to fill and its internal pressure approaches that of the source the larger area side provides a displacement bias to the smaller side to close the cold water source to favor of a draining path from the accumulator until its pressure is relieved. A similar area ratio biased shuttle is also provided on the hot water side shuttling between the accumulator and the outlet until the water flow reaches the desired warm temperature and is then shunted directly into the outlet by the temperature responsive shuttle.

In both instances, however, these area ratio mechanisms are confined to operate within the pressure differential between the municipal water source pressure and the back pressure which itself has been a subject of conservation concerns. Simply, the same economic and environmental interests that serve as the underpinnings for the instant water conserving invention have earlier motivated various flow rate restrictors which invariably raise the effective outlet pressure. To accommodate the substantially narrower pressure band resulting from these pre-existing restrictors a further area ratio shuttle assembly is connected between the accumulator and the cold water outlet which in a manner similar to that described above provides a pressure preference to the flow draining the accumulator.

In this manner the continued operation of the faucet assembly is assured at all the fill states of the accumulator, resolving the potential statistical paradox encumbering most of the prior art devices, a paradox compounded by the interplay between the drinking water demand cycles, the sequential hot water initiations that often are crammed into a narrow time period and the like. Those skilled in the art will appreciate that these periods of repeated drinking and hot water demand tend to follow temporal patterns, e.g., the need for a morning hot shower by all those in a household will result in residual latent heat stored in the branch circuit which will bypass the accumulator cycle, thereby reducing the water accumulated, while the late afternoon drinking demands add to the quantity accumulated that is then self-serving and also useful for the more varied other needs. The inventive by-pass therefore accommodates these use patterns by resolving what heretofore was an operational paradox but in a setting that minimizes waste.

It will be particularly appreciated by those skilled in the art that each of the operative aspects is obtained in response to the opening of a cold or hot water valve, an attribute that is particularly useful with faucet assemblies provided with a single selector arm. Moreover, each of the above operative functions are effected by shuttles or check valves that are completely confined with little or no prospective incidence of leakage to the outside. Simply, once hot or cold water demand begins the corresponding shuttles automatically select the operational state by the lower pressure that results in the particular circuit. Thus the usual operation of a conventional faucet assembly will be converted into a state selection by a hydraulic latch obtained by the area multiples across the several shuttles, thus eliminating most of the disadvantages that have plagued some of the conservation devices earlier proposed.

The effectiveness of the conservation system instantly described can be enhanced even further by interconnections between several accumulators within the household or by connecting several units to a single larger sized accumulator to produce storage volumes that can serve other conservation concerns. Since most residential construction attempts to localize bathrooms and other water dispensing facilities to reduce the cost and losses of plumbing circuits the typical back-to-back arrangements are particularly convenient in effecting accumulator interconnections so that the statistical accumulator logjam in one bathroom is shared with another. Thus the unused guest bathroom can help to maintain the conservation efficacy in the busier bathroom across the wall, an attribute that is rendered convenient by the ease of installation and inherent reliability of the inventive system.

DESCRIPTION OF THE PREFERRED EMBODIMENTS

Figure 1:
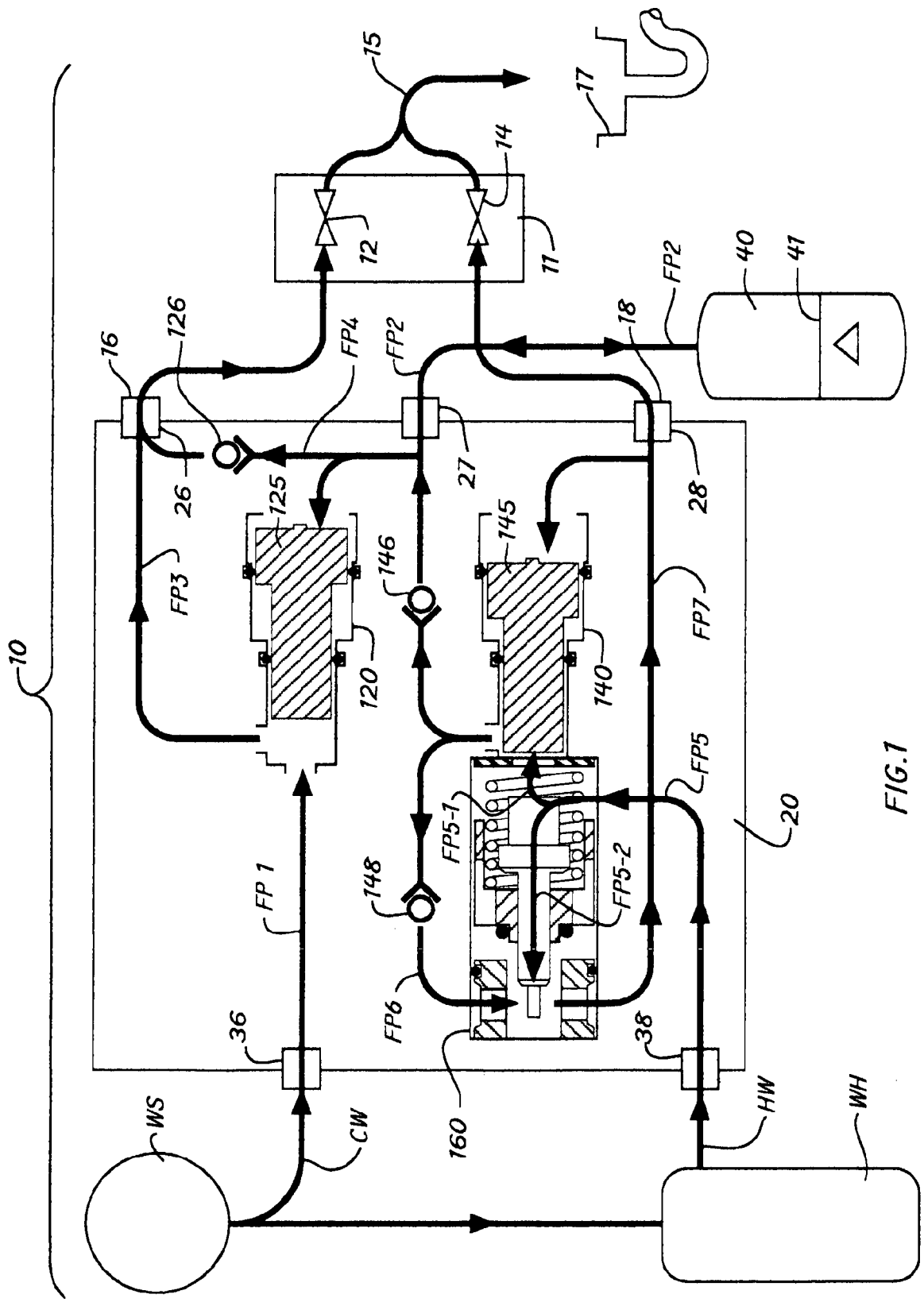
FIG. 1 is a diagrammatic illustration of one exemplary plumbing circuit incorporating a first embodiment of the inventive conservation system in a portion thereof.
Figure 2:
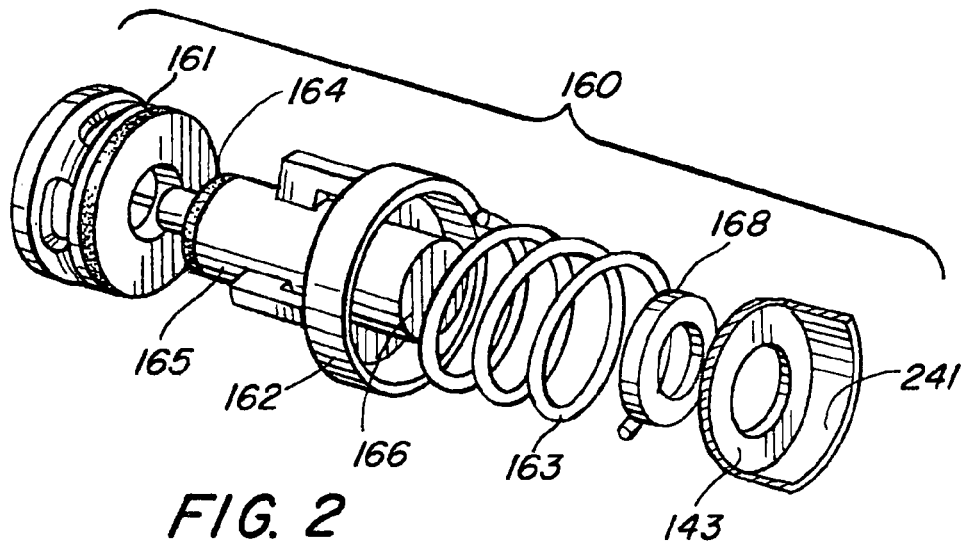
FIG. 2 is a perspective view, separated by parts, of the respective operative portions of a temperature activated shuttle valve directing the flow through a plenum cage defining an alternative flow path in accordance with its first shuttle position corresponding to a sensed low temperature and a second position corresponding to a sensed high temperature to open a second flow path therethrough.

As shown in FIGS. 1-4, the inventive water conservation system, generally designated by the numeral 10, comprises a conventionally implemented faucet assembly 11 provided with a cold water valve 12 and a hot water valve 14 each conventionally conformed for connection by known water tight connectors 16 and 18 either directly to the local water supply WS or to the outlet of a conventional water heater WH that form the corresponding cold water and hot water plumbing branches CW and HW running through a household. By well known conventional practice valves 12 and 14 are either coordinated for operation by a single, manually articulated lever or by individually associated mechanisms that control the flow therethrough into a common outlet 15.

Of course, ordinary prudence demands that all excess flow from each faucet assembly be confined by a tub, sink basin, shower pan or the like, and conveyed through a drain 17 into the sewer. In conventional practice this excess flow also included the wasted water stream released through the hot water valve 14 until the desired temperature was reached.

To limit this loss of clean water the inventive conservation system 10 interposes between connections 16 and 18 and the corresponding cold and hot water branches CW and WW a unitary valve block 20 respectively joined at its outlet connections 26 and 28 to the valve connections 16 and 18, thereby completing the circuits to supply valves 12 and 14, and by inlet connections 36 and 38 to the hot and cold water branches HW and CW to direct the heretofore wasted flow into an accumulator 40 also tied to the valve block across a further outlet connection 27. Of course, since the valve block 20 is intended for interposing connection between the faucet assembly that is usually fixed in its location and the locally available hot and cold water branches that are also fixed, all the inventive functions thereof need to be imperceptible to the user.

Simply, in order to be useful all the inventive functions need to be effected in response to conventional articulations of familiar valve mechanisms, without any direct mechanical connection with the user. Moreover, these same replacement constraints also impose a size limitation on the valve block to a size that will fit into the available spaces under a sink, or in spaces between wall studs, and the accumulator itself may also be similarly sized to fit in a sink console or between typical wall stud spacing.

All these constraints are inventively accommodated within block 20 by a set of manifolded and check valve regulated interconnections between two shuttle valve assemblies 120 and 140, each including a shuttle defined by two differently sized opposing piston faces of a corresponding piston assembly 125 and 145 that are shuttled between the limits of corresponding bores in response to the force differentials across each shuttling piston assembly. It is these shuttling movements that then close and/or open the several alternative flow paths through the valve block, that resolve the flows through a temperature activated valve assembly 160 into or out of the accumulator and the respective faucet valves.

More precisely, within the accumulator ratio shuttle assembly 120 its piston assembly 125 includes a smaller piston 121 at one end that in the course of its stroke closes a valve seat 123 and a lateral port 127 and an opposed larger piston 122 that communicates with a check valve 126 and also with accumulator 40. The accumulator ratio assembly 120 effectively amplifies the comparison of the pressure difference between the water supply WS and the accumulator by the piston area ratio, and if the accumulator has fluid the shuttle closes the cold water flow at seat 123 and replaces it by accumulator drainage flow across the check valve.

Similarly, shuttle assembly 140 also includes a piston assembly 145 comprising a smaller piston 141 closing a seat 143 and a lateral port 147 at the end of its stroke and an opposing larger piston 142 at the other end that communicates with the hot water faucet valve 14 but in this setting it is the pressure drop at the larger piston associated with the opening of valve 14, as multiplied by the piston area ratio, that articulates the shuttling stroke. The hot water flow input to seat 143 originates at the temperature activated valve assembly 160 comprising a follower cage 162 mounted on a bias spring 163 and provided with a seal 164 axially mounted on a thermostatic actuator 165 that extends into the interior of a plenum cage 161 against which the sealing contact is made.

An axially aligned cylindrical plug 166 at the other end of the thermostatic actuator 165 then extends into the common annuli of the follower cage 162 and spring 163 to compress a sealing washer 168 on the exterior face of the seat 143 of shuttle assembly 140 when the thermostatically set temperature is reached. Accordingly, in this position of the thermostatic actuator 165 the hot water flow that enters into the valve assembly 160 through a lateral port 167 is conveyed through the follower cage 162 and across the open seal 164 into the plenum cage 161 to be then conveyed into the outlet 28 and then through the open valve 14.

Before the set temperature is reached, however, the lower pressure level at piston 142 that is associated with the opening of the hot water valve 14 articulates the piston assembly 145 to open the seat 143 allowing the conveyance of hot water into the lateral port 147 from where it is branched to check valves 146 and 148, the first feeding the accumulator and the latter opening a flow path through the plenum cage 161 to the outlet 28, by-passing the conservation functions during those instances when the accumulator is full.

The several flow paths that are thus formed are best appreciated by particular reference to FIG. 1. Focusing on the draining process of accumulator 40 first, the cold water flow CW follows the flow path FP1 across inlet connection 36 to the inlet of the shuttle assembly 120 controlled by a valve seat 123 that is opposed by the smaller piston 121 of piston assembly 125 shuttling within its interior which, at the opposite side, includes the larger piston 122 that communicates directly through flow path FP2 with accumulator 40, and therefore is exposed to its internal pressure. Thus when the total force on the smaller piston 121 is greater than the total force on the larger piston 122, i.e., when the accumulator is close to empty, piston 121 shuttles away from seat 123 allowing the water flow from path FP1 to exit through a lateral port 127 now exposed and thence along path FP3 to the open cold water faucet 12.

If, however, the accumulator begins to fill and its internal pressure increases, then the multiple of the piston ratios forces piston assembly 125 to close valve seat 123 directing the flow from path FP2 to check valve 126 to form a draining flow path FP4 each time valve 12 is opened. Once fully drained the drop in the pressure at the larger piston 122 opens seat 123 and also the port 127 and the cold water from branch CW then continues through valve 12. Thus every time the cold water valve opens the accumulator is drained in a hydraulically latched operation that is obtained through the use of unequal pistons.

Those skilled in the art will appreciate that the foregoing latching articulation is essentially imperceptible to the user and will occur each time cold water is demanded. Simply, whenever the total force at the larger piston face 122 exceeds the total force at the smaller piston face 121 valve seat 123 is closed while a draining path from the accumulator opens to replace the blocked cold water stream. Since a conventional accumulator, and also accumulator 40, typically include a pressure biasing membrane 41, the net result is that virtually all the water in the accumulator will be drained whenever valve 12 remains open for a sufficient period.

On the hot water side the flow path FP5 from the hot water circuit 11W feeds both the valve seat 143 and also the follower cage 162. Until the thermostatic actuator 165 opens the only path for the hot water flow is then along the flow path FP5-1 that branches from path FP5 through seat 143 and then through port 147 to the opposed check valves 146 and 148 which are biased such that if the accumulator pressure is low, indicating an empty accumulator, check valve 146 opens and the flow path FP2 is then directed into the accumulator. When, however, the accumulator pressure is high, indicating a full accumulator, check valve 146 remains closed and the flow is then directed through check valve 148 into branch FP6 to pass through the plenum cage 161 into the outlet flow path FP7. Of course, during all this time the initial low temperature of the hot water flow lifts plug 166 off of the sealing washer 168, keeping seat 143 open.

Once the thermostatic actuator 165 opens seal 164 then a second flow path branch FP5-2 is set up through the now open seal 164 to merge again with the flow path FP7, with the lower pressure at the open valve 14 then also communicated to the larger piston 142 of shuttle assembly 14 while at the same time the plug 166 closes seat 143, dropping the pressure volume at the smaller piston 141 while the larger piston 142 is exposed to the flow, thus once again forming a latching bias by the unequal sides of a single piston assembly.

Those skilled in the art will appreciate that when valve 14 is opened the reduced pressure on the larger piston 142 articulates the shuttle to open valve seat 143, exposing the lateral port 147 to convey the hot water flow from the inlet connection 38 to both the check valves 146 and 148 and if the accumulator back pressure behind check valve 146 is lower than the hot water pressure plus the check valve spring bias the flow will be collected in accumulator 40. Once this back pressure threshold is exceeded and no further water flow can be stored in the accumulator then check valve 148 opens directing the flow path through the plenum cage and thence directly out of the faucet valve 14. In this manner the basic function of the faucet assembly 11 is retained even during those instances when accumulator 40 is full.

It will be appreciated that each of the shuttle assemblies 120 and 140 operate as bi-stable hydraulic latches operating between the water pressure in the supply WS, the intermediate pressures set by the various check valves 126, 146 and 148 and the pressures at the outlets 26 and 28 when the corresponding valves 12 or 14 are opened. Since the bias levels of the springs associated with the corresponding check valves are each fully selectable and since the local pressure levels of the municipal water supply WS are well known a well-defined set of pressures can be developed across each shuttle every time a valve is opened. Moreover, the fully confined nature of each of the shuttle assemblies within valve block 20 confines all leakage across the seals thereof to the flow out of the faucet assembly, resulting in a reliable and virtually imperceptible manner of operation.

One will also appreciate that the shuttling translation of piston assembly 125, and by similar considerations also piston assembly 145, each entail a trapped volume that varies in size while confined between the respective piston seals. More precisely, shuttle assembly 120 and the substantially similar shuttle assembly 140 each entail the shuttling translations of the smaller pistons 121 and 141 within mating bores 221 and 241 that are each sealed by corresponding O-rings 321 and 341. These shuttling strokes, of course, are each matched by linear strokes of equal length of the larger pistons 122 and 142 translating within their mating bores 222 and 242 across sealing O-rings 322 and 342 and since the bore volume trapped between both the seals 321 and 322 include an area transition from the smaller to the larger size the corresponding volumes of the piston assemblies 125 and 145 that are trapped between the seals change with the shuttling stroke times the piston area difference.

While the resulting pressure pulse consequent to this variation of the trapped volume can be minimized in known manners, e.g., by increasing the total trapped volume as compared to its change, or by allowing for controlled relieving leakages across the seals, the invention provides for a fully effected relieving arrangement of each of the trapped volumes. More precisely the invention includes a pair of opposed relief valves 421 and 422 at the ends of a common drilling 423 across shuttle assembly 120 communicating into the trapped volume between seals 321 and 322, respectively relieving any negative pulse by admitting air from the exterior or by transferring a positive spike into the other trapped volume between seals 341 and 342 around piston assembly 145. A further relief valve 444 across the larger piston 142 then allows any built up water in this trapped volume to be pushed out into the flow through valve 14.

Each of the relief valves in this circuit are sized to accommodate only small volumetric changes therefore their flow rate capacities may be limited to result in some flow restriction that will then dampen the impacts at the ends of the strokes while also bringing its average pressure to a level between the two relieving pressures. In this manner quiet and virtually imperceptible shuttle translations are effected in a structure in which all the leakage paths are confined to the flow paths of the hot and cold flows.

One, of course, will appreciate that the same concerns over water conservation have also spawned other solutions, most often in the form of flow restrictors on those water outlets that emit large water flows, e.g., restrictors in showerheads. Such restrictors, exemplified in FIG. 5 by way of restrictor 520 in the outlet of valve assembly 11, may raise substantially the back pressure in flow paths FP3 and FP7, to a point where the pressure differentials across piston assemblies 125 and 145 are insufficient to overcome their area ratio differentials.

Figure 5:
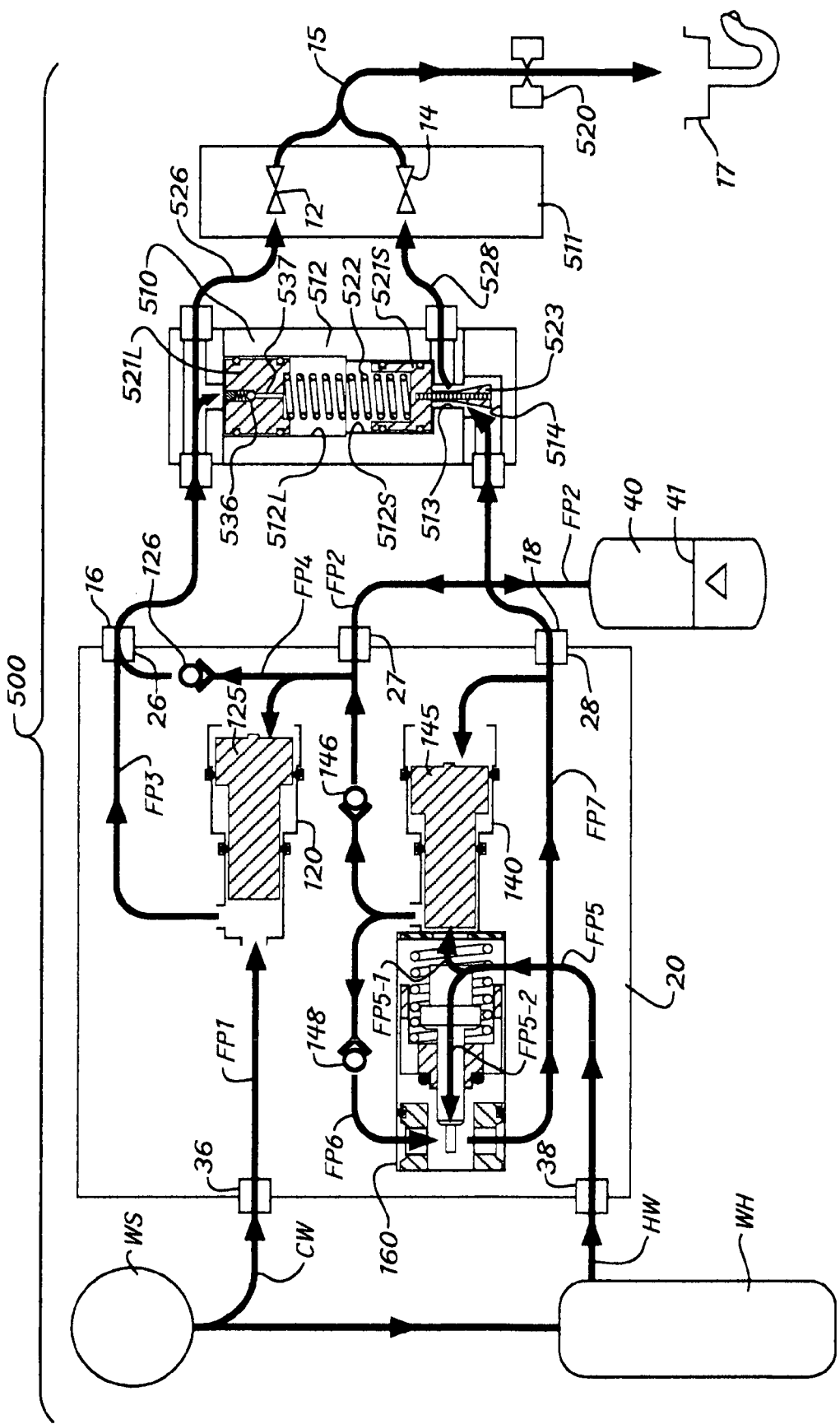
FIG. 5 is a further diagrammatic illustration of the exemplary plumbing circuit incorporating a second embodiment of the inventive conservation system conformed for operation with a restricted outlet.
Figure 6:
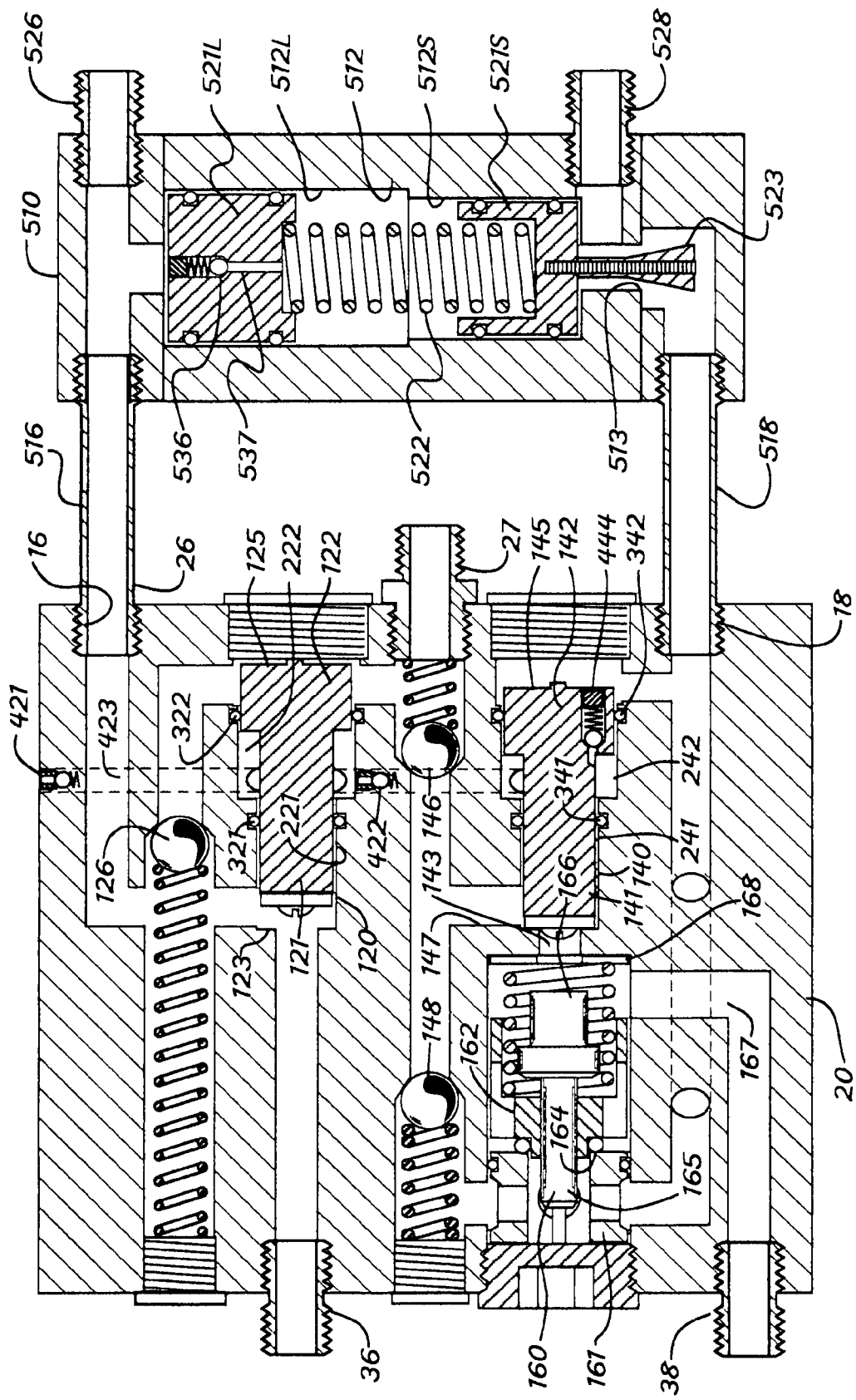
FIG. 6 is a further sectional diagram of the inventive valve assembly incorporating further area ratio provisions for operation with a restricted outlet according to the flow diagram shown in FIG. 5.

By particular reference to FIGS. 5 and 6 the continued functioning of the inventive conservation system is assured even in a setting wherein flow restrictors 520 produce large back pressures by interposing an equalizer assembly 510 between the hot and cold outlets 18 and 16 and the valve assembly 11, resulting in an integrated system generally designated by the numeral 500. Like numbered parts functioning in a like manner to that previously described, equalizer 510 includes once again a stepped cylinder 512 in which the larger bore 512L communicates with the cold water outlet 16 through an inlet feed connection 516 with the same cold water flow then also continuing into an outlet feed connection 526 to the cold water inlet of valve assembly 511. In a similar manner the smaller bore 512S communicates through a drilling 513 into a passage 514 joining a warm water inlet feed 518 from outlet 18 and an outlet feed 528 extending to the warm side of valve assembly 511.

The stepped cylinder 512, in turn, includes two opposed pistons 521L and 521S respectively received in mating fit within the corresponding large and small bores 512L and 512S thereof to compress a helical spring 522 therebetween. The smaller piston 521S, moreover, is provided with a pintle 523 that extends through the drilling 513 to reduce the flow therethrough upon the displacement of the piston 512S from its limit to thereby reduce the warm water flow to valve assembly 511. This displacement compresses spring 522 trapped at the other end by piston 521L and is therefore further loaded by the cold water stream pressure in the larger bore 512L resulting in a floating pressure equilibrating process that defines according to the respective piston areas the pressure differential thereacross.

This mutually opposed floating piston combination thus results in a compensating arrangement that allows the diversion of the initial cold and tepid stream out of the accumulator by restricting the hot water flow at the higher back pressures resulting from various flow restrictors. Simply, since the drilling 513 with the pintle 523 in it add to the restriction of the warm water flow when the opposing cold water pressure on the larger piston 521L is reduced, both sides of the assembly respond to the increased back pressure resulting from restrictor 520 reducing both the warm and cold water outlet pressures at the flow ratio selected by the valve assembly. The bias of the larger area of the cold water piston 521L will thus also reduce the warm water flow on the other side of the interposed spring 522 by displacing the pintle to also reduce the warm water flow, thereby accommodating both the conservation effects of the restriction and the pressure biases needed for the instant flow diversion out of the accumulator.

Of course, the shuttling of the complete combination comprising unequally sized pistons 521S and 521L with the spring 522 trapped between them will produce a similar volumetric trap discussed earlier by reference to piston assemblies 125 and 145. This volumetric trap is resolved in a mariner like that previously set out, once again effected by a spring biased relief valve 536 fitted within a bleed passage 537 communicating across the larger piston 521L. It is to be particularly noted that the resulting bleed circuit thus obtained, and also the trapped volume bleeds in shuttle assemblies 120 and 140, do not just resolve the trapped volume paradox but, most importantly, also provide a damping function by their flow restrictions that effectively dampens any inherent oscillatory dynamics of the combination described.

As summarized above, even further water conservation can be obtained by combining with the inventive system described above with other water use processes that entail substantial water waste, such as the processes associated with the purification of drinking water. Since most current municipal water supplies are virtually pathogen free these purification processes seek to reduce the amount of dissolved or suspended matter in order to improve the taste of the water and not its safety in a process that essentially shifts a portion of the unwanted constituents of the water stream into that portion thereof that is sent down the drain, a process often effected by reverse osmosis. Of course, this results in the waste of water that is essentially safe but somewhat more concentrated in unwanted matter, a condition easily diluted by collection of other wasted water streams.

Figure 4:
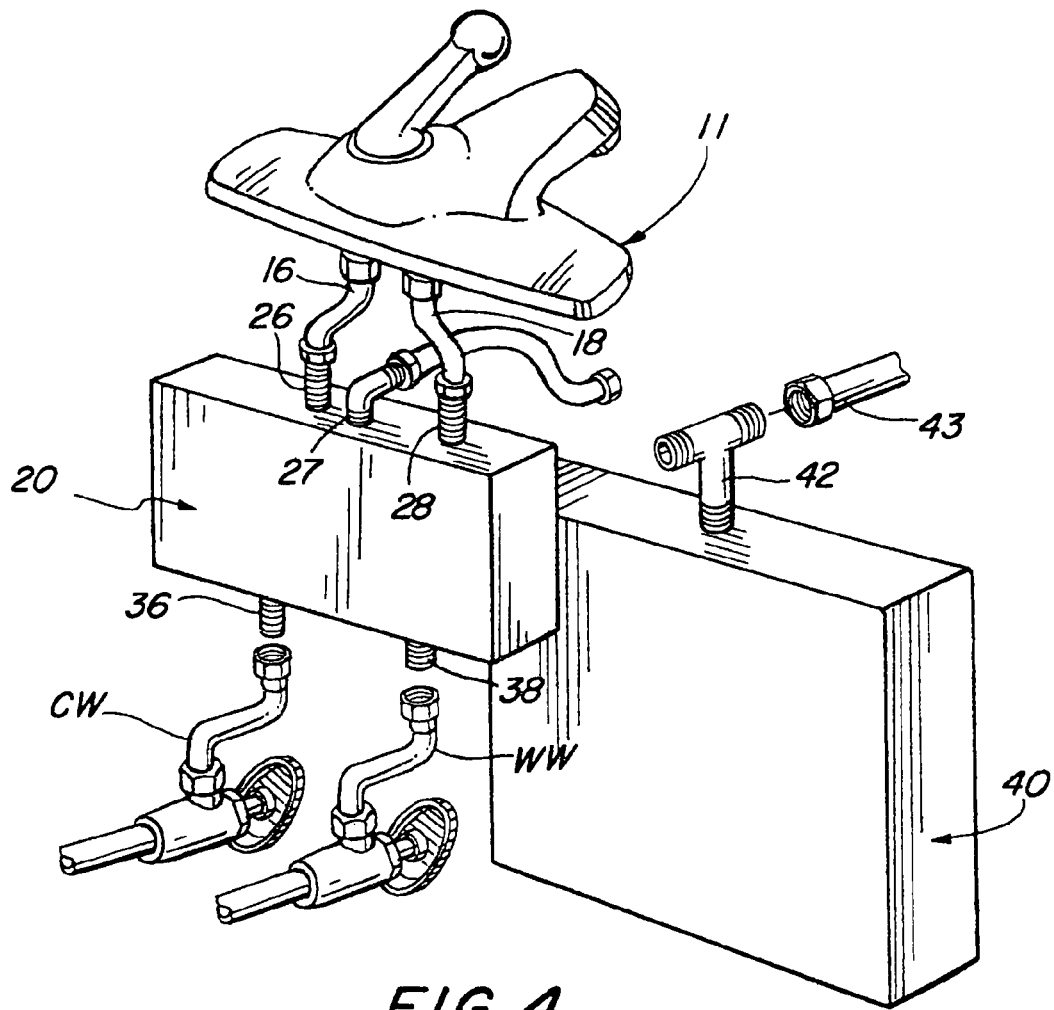
FIG. 4 is a perspective illustration, separated by parts, of a conventional faucet assembly adapted for connection to the inventive conservation system in its unitary form collectively arranged for installation convenience along with the replacement of the faucet assembly and including an interconnection between one or more accumulators serving plural inventive conservation systems deployed in adjacent proximity relative each other.
Figure 3:
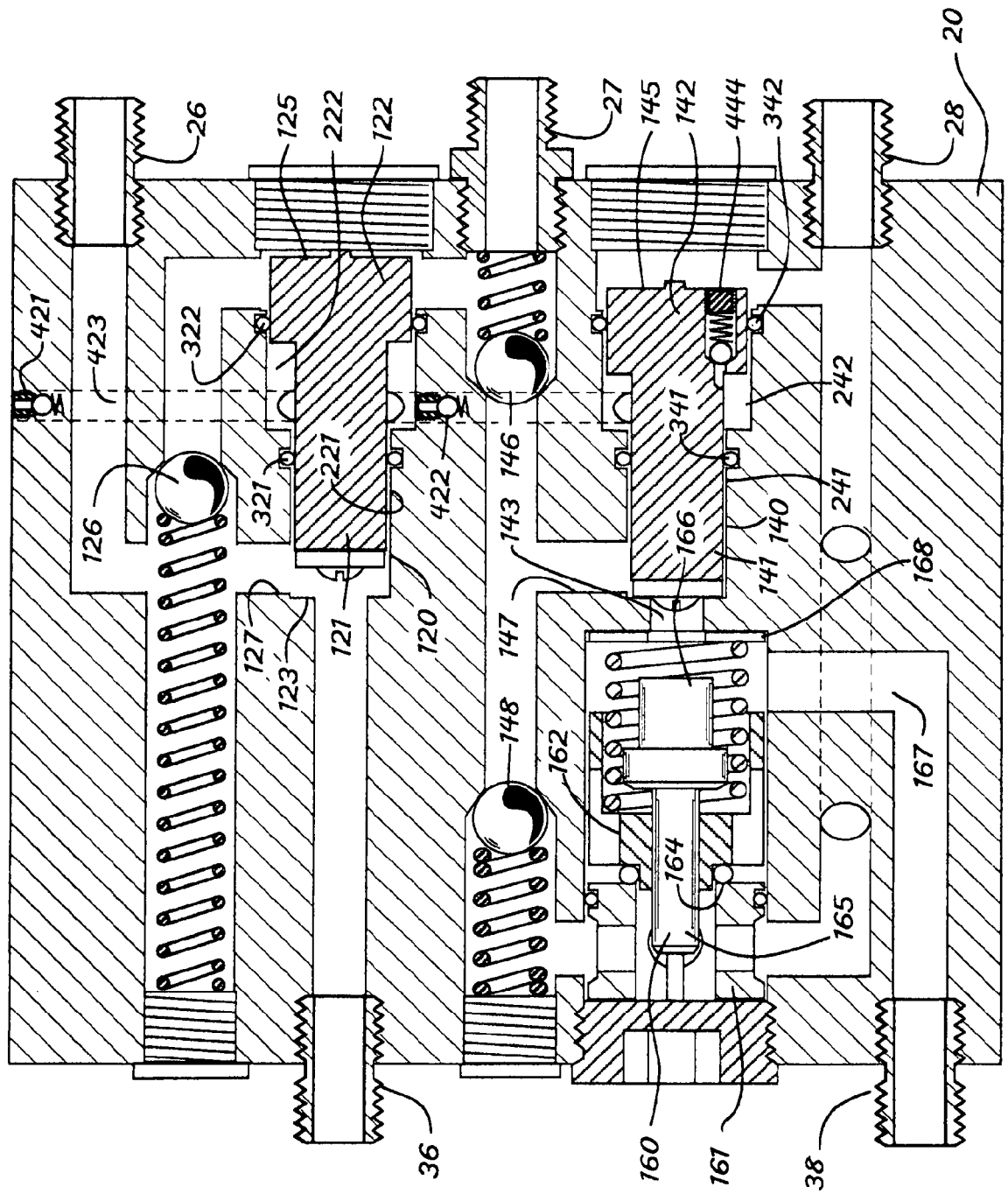
FIG. 3 is a sectional diagram of an integrated valve assembly including the several operative elements of the inventive conservation system interconnected by a manifold to form a unitary valve block.

While the inventive conservation system described above illustrates a single accumulator 40, in a one-to-one association with a faucet assembly 11 and its associated valve block 20, such a rigorous association is not required. For example, as illustrated in FIG. 4, a tee connection 42 may be included at the accumulator inlet which then, through a connection tubing 43, can also service another faucet and valve block combination that is proximately deployed. Since construction economies are best effected when plumbing networks are branched to service several adjoining areas this accumulator sharing convenience is particularly beneficial for clustered plumbing arrangements that reduce the effective volume of the branches to further enhance conservation.

Those skilled in the art will appreciate that while a clustered plumbing array is useful in conserving heat losses the accumulator volume that conserves water use can be distributed. Simply, their heat loss is no longer a concern. A plumbing arrangement in which several accumulators may be interconnected synergistically also allows for the expansion of the conservation benefits to include the above referenced other household processes in which large amounts of water are currently sent down the drain by enabling the benefits of dilution somewhat higher concentrations and, therefore, the most important aspects of statistical averaging.

Figure 7:
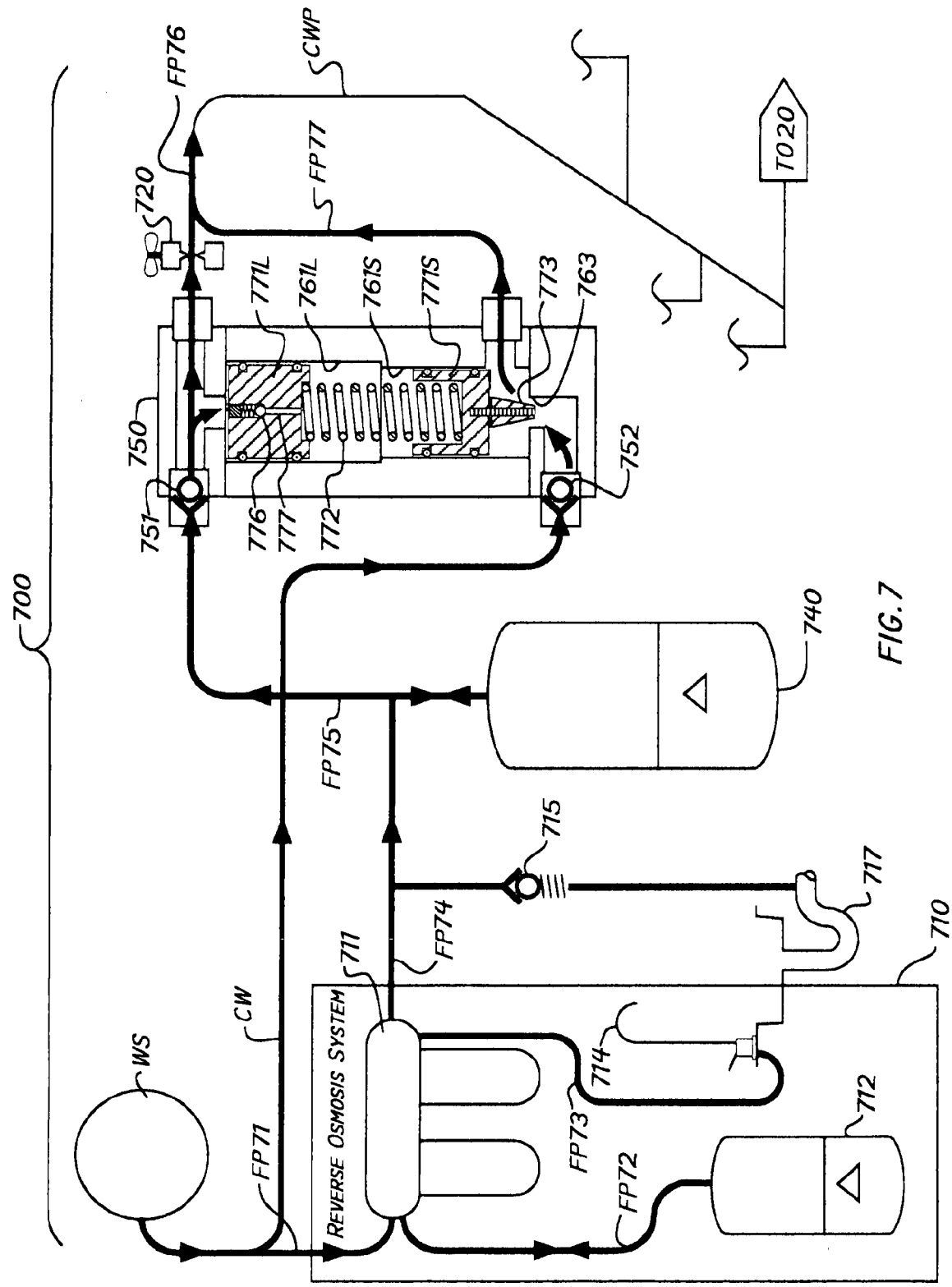
FIG. 7 is yet another diagrammatic illustration of a reverse osmosis purification system inventively connected for conserving the unused portion thereof.
Figure 8:
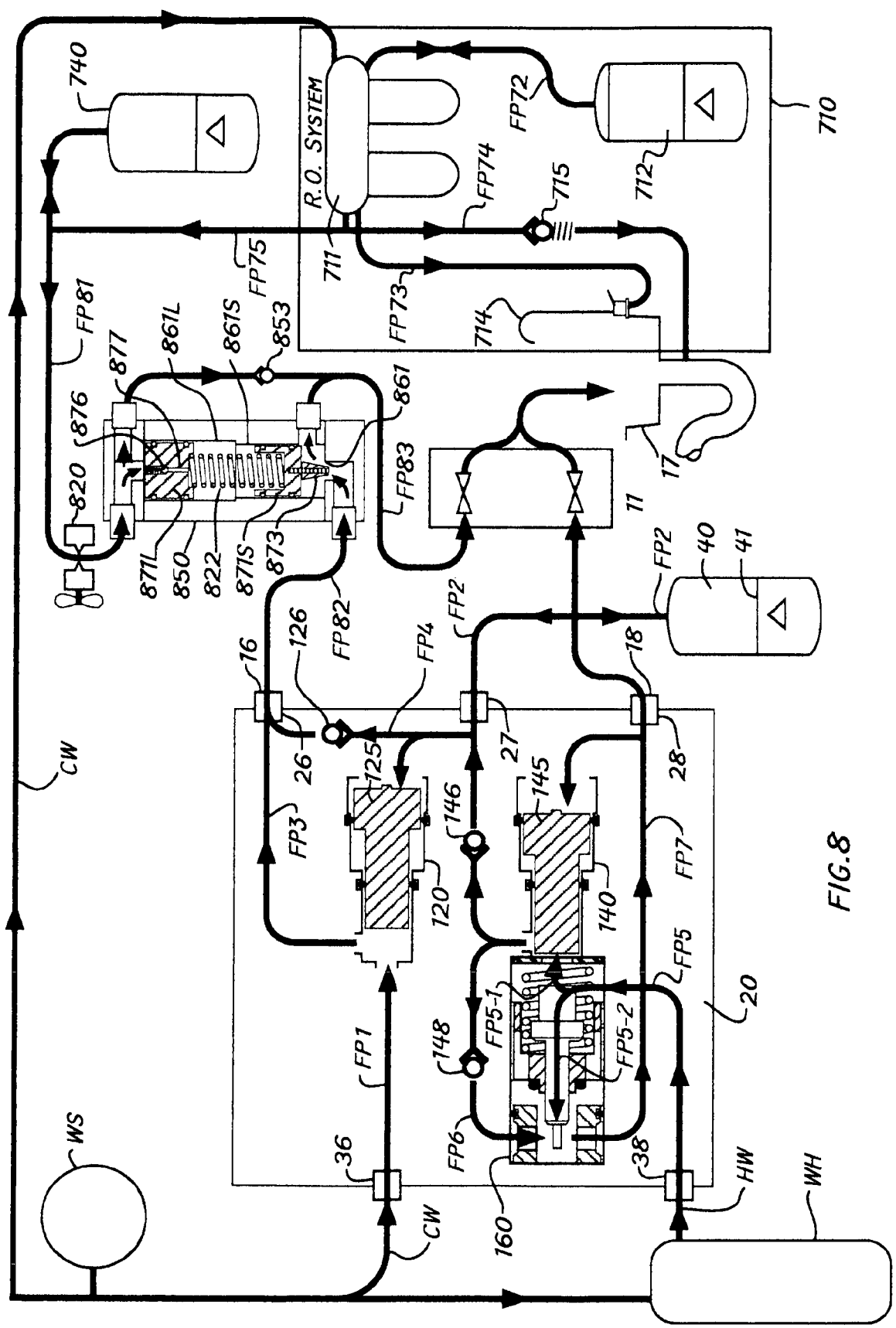
FIG. 8 is a yet further diagrammatic illustration of a plumbing circuit combining the inventive conservation system with the reverse osmosis process.

By reference to FIGS. 7 and 8 these conservation combinations are best exemplified by the integration of the system described herein with systems entailing the large waste water stream byproducts associated with drinking water purification, such as the well-known reverse osmosis process for purifying drinking water. This process redistributes the concentration of the particulates and solutes across the osmosis membrane and its waste product usually is the same municipal water that is only slightly more concentrated with unwanted matter and is thus a proper candidate for dilution and storage for other uses thus optimizing the utility of several storage volumes once interconnected. Simply, the distributed sharing of these currently unwanted effluents may be useful to dilute each other into a mix which is fully acceptable for the less stringent household demands.

By particular reference to FIG. 7 the conventional reverse osmosis system, generally designated by the numeral 710, includes a reverse osmosis unit 711 connected to receive through flow path FP71 the fresh water CW from the municipal water supply WS (previously received by the cold water flow path FP1 to provide the input flow to the cold water shuttle assembly 120 within valve block 20). The purified water output of the reverse osmosis unit 711 is then fed by flow path FP72 to a purified water storing accumulator 712 and also by flow path FP73 to a centrally located drinking water faucet 714. Concurrently, the water collected at the other side of the osmotic membrane, carrying the higher concentration of the unwanted constituents, is fed by flow path FP74 both to a check valve 715 connected to a drain 717 and also to the inlet of a waste water accumulator 740.

A mixing assembly, generally designated by the numeral 750, is then tied across inlet check valves 751 and 752 to receive respectively the waste water output from accumulator 740, conveyed by flow path FP75, and to the fresh water stream CW conveyed from the source WS. Once again, assembly 750 includes a pair of opposed unequal pistons with spring trapped between them aligned such that once the waste water pressure in accumulator 740 exceeds the spring bias of check valve 751 it is then routed into the larger cylinder bore 761L to displace a piston 771L fitted therein and opposed by a spring 772 which at the other end is trapped against a smaller piston 771S fitted in the smaller bore 761S that connects to check valve 752.

To set the mixing ratio of the waste water with the fresh water flow a variable flow restrictor 720 in the flow path FP76 out of the larger cylinder bore 761L is adjusted to control the flow rate therethrough while the displacement of a pintle 773 extending from piston 771S through an orifice 763 restricts the cold water flow CW that is passed through the other check valve 752 and then conveyed through flow path FP77 to merge with flow path FP76. Of course, in a manner similar to that previously described a relief valve 776 in a bleed passage 777 extending through the larger piston 771L again resolves the volumetric trap inherent in these unequal cylinder volumes with the mixture then feeding the cold water plumbing CWP of the household which may also include the other water conserving aspects of valve block 20.

While the foregoing mixing for re-use of the waste water produced in the course of drinking water purification is illustrated in FIG. 7 to occur right at the fresh water source WS, it will be appreciated that the same may be effected in conjunction with the other conserving processes set out above. By particular reference to FIG. 8 wherein like numbered parts operate in a like manner to that previously described, the operative elements illustrated in FIG. 7 are shown in an integrated combination with the operative elements of FIG. 1.

More precisely, the fresh water CW that is conveyed to the inlet fitting 36 of the valve block 20 is also branched into the flow path that then supplies the reverse osmosis unit 711 within the purification system 710. The purified water output of unit 711 is then fed by flow path FP72 to the drinking water accumulator 712 and by flow path FP73 to the drinking faucet 714 while the waste water output is conveyed by flow path FP74 both to the check valve 715 that connects to the drain 717 and also by flow path FP75 to the waste water accumulator 740. In this integrated configuration, however, the accumulator 740 then connects by way of flow path FP81 provided with a variable restrictor assembly 820 directly to a mixing assembly generally designated by the numeral 850 which, while functioning substantially like the earlier described assembly 750, entails several modifications.

Mixing assembly 850 again includes an unequally sized axially spaced cylinder arrangement in which the larger cylinder 861L is fitted with a larger piston 871L and the smaller bore 861S with a smaller piston 871S compressing a spring 822 captured between them. The larger cylinder 861L then receives the waste water flow in flow path FP81 as restricted by the variable restrictor 820 while the smaller piston 871S axially extends a pintle 873 through an orifice 861 to modulate the flow rate through a fluid path FP82 extending from the cold water outlet 16 on the valve block 20. This modulated flow is then mixed with the restricted waste water flow in flow path FP81 in a flow path manifold FP83 if the pressure differential therebetween exceeds the spring bias of a further check valve 853 and then conveyed to the valve assembly 11.

Of course, the same unequal volume paradox being captured between the two pistons, the larger piston 871L also includes a relief drilling 877 controlled by a spring loaded check valve 876 to vent this confined volume. As before, these several narrow relief paths obtain the further benefit of damping which is particularly significant in plumbing systems that combine several variously interconnected closed loops.

In this manner various combinations of the several water conserving containers can be inventively combined to support each other in an easily installed form that results in a virtually imperceptible conservation process. Significantly, these interconnections can be effected in a stepwise manner, thereby accommodating most household budgets as the size and water demands of a household grow. Once these easily effected conservation processes are widely distributed large reductions in clean water use can be realized resulting in great reductions in the consumption of this very critical resource.

Obviously many modifications and variations of the instant invention can be effected without departing from the spirit of the teachings herein. It is therefore intended that the scope of the invention be determined solely by the claims appended hereto.

It is claimed:
1. In a plumbing circuit including a cold water stream and a hot water stream respectively connected to the cold water valve and the hot water valve of a faucet assembly provided with a flow restrictor downstream of the cold water valve and the hot water valve, the improvement comprising:
  an accumulator including a water receiving cavity and a pressure biasing member therein, said accumulator flow connected to the cold water stream through a cool water discharge branch;
  temperature actuated flow diverting means interposed to receive said hot water stream for diverting said hot water stream into said accumulator if the temperature thereof is below a predetermined temperature and into a hot water outlet line flow connected to said hot water valve if the temperature thereof is above said predetermined temperature;

bypass means interposed between said diverting means and said accumulator for bypassing said accumulator during such periods when said accumulator is substantially full of water and to convey said hot water stream into said hot water outlet line;

a flow control valve connected to said accumulator and to said cold water stream; said flow control valve blocking the flow of water from a cold water supply to said cold water stream when the pressure exerted on water in the cool water discharge branch by the pressure biasing member in the accumulator exceeds a preselected fraction of the pressure of the water from the cold water supply such that water flows from said accumulator into said cold water stream and to said cold water valve at a first pressure which is below the pressure of the water from the cold water supply; and said flow control valve allowing water to flow from the cold water supply to said cold water stream at a second pressure when the pressure exerted on water in the cool water discharge branch by the pressure biasing member in the accumulator drops below a preselected fraction of the pressure of the water from the cold water supply and wherein the second pressure exceeds the first pressure and thereafter directing said cold water stream into said cold water valve;

pressure compensating means flow connected to said hot water outlet line between said hot water valve and both said bypass means and said temperature actuated flow diverting means and to said cold water stream between said accumulator and said cold water valve for restricting the flow through the hot water outlet line to said hot water valve when the pressure in the cold water stream decreases to thereby concurrently increase the flow from said accumulator through said cold water valve.

2. In a plumbing circuit according to claim 1, wherein: said pressure compensating means includes an axially arranged opposing set of pistons including a first piston communicating with said cold water valve and said accumulator, an opposingly aligned second piston communicating with said hot water valve and said hot water outlet line and a spring compressed between said first and second pistons, said second piston further including a pintle deployed into an orifice for controlling the flow rate through said hot water outlet line and into said hot water valve.

3. In a plumbing circuit according to claim 2, further comprising: a relief passage formed through said first piston for relieving the pressure in the volume captured between said first and second pistons; and a spring loaded check valve received in said relief passage.

4. An apparatus connectable between a hot water supply and a plumbing fixture hot water outlet and a cold water supply and a plumbing fixture cold water outlet, wherein the hot water outlet and the cold water outlet flow through a flow restrictor, the apparatus adapted for diverting into storage the initially cool portion of a hot water stream from the hot water supply and to discharge the diverted cool portion from storage upon opening of the plumbing fixture cold water outlet, comprising:

an accumulator having a pressure biasing member therein;
a hot water flow control valve having a thermostatic actuator selectively connecting the hot water supply to a cool water outlet when the temperature of water flowing through said hot water control valve is below a predetermined temperature or to a hot water outlet when the temperature of the water flowing through said hot water control valve exceeds the predetermined temperature; said cool water outlet flow connected to a cool water inlet of a hot water request valve; said hot water outlet flow connected to a hot water outlet line which is flow connected to the plumbing fixture hot water outlet;

said hot water request valve having a first piston selectively connecting said cool water inlet to a cool water discharge port in said hot water request valve when said plumbing fixture hot water outlet is opened and blocking said cool water discharge port from said cool water inlet when said plumbing fixture hot water outlet is closed;

said cool water discharge port of said hot water request valve flow connected to a cool water trunk line which splits into a storage branch flow connected to said accumulator and a cool water discharge branch flow connected to the plumbing fixture cold water outlet;

a cold water flow control valve having a cold water inlet flow connected to the cold water supply, a cold water outlet flow connected to the plumbing fixture cold water outlet and a second piston; said second piston selectively advanceable between a closed position in which said second piston blocks said cold water outlet from said cold water inlet and an open position in which said second piston is withdrawn from blocking said cold water outlet from said cold water inlet thereby flow connecting the cold water supply to the plumbing fixture cold water outlet; said second piston is in communication with said cool water discharge branch and said cold water supply and configured such that pressure in said cool water discharge branch advances said second piston to said closed position until the pressure in the cold water supply exceeds a preselected multiple of the pressure in said cool water discharge branch;

said pressure biasing member increasing the pressure exerted on water in said accumulator, said storage branch and said cool water discharge branch as the volume of water in said accumulator increases; wherein water flowing into said cool water trunk line through said hot water request valve flows into said accumulator through said storage branch until the pressure exerted on the water in said accumulator by the pressure biasing member approaches the pressure of the water flowing into said cool water trunk line; and when said plumbing fixture cold water outlet is opened, water contained in said accumulator is urged out of said accumulator and out said plumbing fixture cold water outlet through said storage branch and said cool water discharge branch until the pressure of the water in the cold water supply exceeds the preselected multiple of the pressure in the cool water discharge branch exerted thereon by said pressure biasing member in said accumulator; wherein the apparatus further comprises:

pressure compensating means flow connected to said hot water outlet line upstream of said hot water outlet and to said cold water stream between said accumulator and said cold water outlet for restricting the flow through the hot water outlet line when the pressure in the cold water stream decreases to thereby concurrently increase the flow from said accumulator through said cold water outlet.

* * * * *